United States Patent
Takehisa

(10) Patent No.: US 9,583,908 B2
(45) Date of Patent: Feb. 28, 2017

(54) PULSED IODINE LASER APPARATUS

(71) Applicant: Kiwamu Takehisa, Kawasaki (JP)

(72) Inventor: Kiwamu Takehisa, Kawasaki (JP)

( * ) Notice: Subject to any disclaimer, the term of this patent is extended or adjusted under 35 U.S.C. 154(b) by 0 days.

(21) Appl. No.: 14/857,114

(22) Filed: Sep. 17, 2015

(65) Prior Publication Data
US 2016/0365695 A1 Dec. 15, 2016

(30) Foreign Application Priority Data
Jun. 11, 2015 (JP) .................................. 2015-118102

(51) Int. Cl.
| | |
|---|---|
| *H01S 3/223* | (2006.01) |
| *H01S 3/036* | (2006.01) |
| *H01S 3/092* | (2006.01) |
| *H01S 3/22* | (2006.01) |
| *H01S 3/23* | (2006.01) |

(52) U.S. Cl.
CPC ............... *H01S 3/036* (2013.01); *H01S 3/092* (2013.01); *H01S 3/2215* (2013.01); *H01S 3/2308* (2013.01)

(58) Field of Classification Search
CPC ........ H01S 3/036; H01S 3/092; H01S 3/2308; H01S 3/2215
See application file for complete search history.

(56) References Cited

U.S. PATENT DOCUMENTS

| | | | | |
|---|---|---|---|---|
| 4,272,681 | A | * 6/1981 | Fill | .................. B01D 59/34 204/157.22 |
| 5,369,660 | A | 11/1994 | Schlie et al. | |
| 5,425,044 | A | * 6/1995 | Schlie | .................. H01S 3/2215 372/55 |
| 6,154,478 | A | * 11/2000 | Vetrovec | .............. H01S 3/2215 372/34 |

FOREIGN PATENT DOCUMENTS

GB          1488937 A  * 10/1977  ......... H01S 3/09505

OTHER PUBLICATIONS

Hays, G. et al., "Chemically Pumped Iodine Laser as a Fusion Driver," IEEE Journal of Quantum Electronics, vol. 17, No. 9, Sep. 1981, 5 pages.
Bannister, J. et al., "The Atomic Iodine Photodissociation Laser," Laser Focus, vol. 20, No. 8, Aug. 1984, 4 pages.
Endo, M. et al., "Atomic Iodine User Utilized High-Pressure Pulsed Singlet Oxygen Generator," Journal de Physique IV Colloque, vol. 1, No. C7, Dec. 1991, 5 pages.
(Continued)

*Primary Examiner* — Yuanda Zhang
(74) *Attorney, Agent, or Firm* — John D. Russell

(57) ABSTRACT

The disclosed invention relates to a pulsed iodine laser apparatus. The laser apparatus has a flashlamp-pumped iodine laser oscillator which produces a laser pulse with a full pulse width of longer than 1 microsecond, and a COIL amplifier. The laser apparatus may has a controller which controls the timing of injecting chlorine gas contained in a high-pressure chlorine tank into the singlet oxygen generator by outputting an open/close signal of the valve V2, and the timing of injecting iodine molecules contained in a iodine molecule tank into an amplifier chamber of the COIL amplifier.

4 Claims, 12 Drawing Sheets

(56) References Cited

OTHER PUBLICATIONS

Endo, M. et al., "Performance characteristics of a high-pressure pulsed singlet oxygen generator," Journal of Applied Physics, vol. 71, No. 15, Jun. 15, 1992, 8 pages.
Takehisa, K., "Considerations of a ship defense with a pulsed COIL," Proceedings of SPIE vol. 9650, Technologies for Optical Countermeasures XII; and High-Power Lasers 2015: Technology and Systems, Sep. 21, 2015, Toulouse France, 12 pages.
European Patent Office, Extended European Search Report Issued in Application No. 16157194.8, Oct. 28, 2016, Germany, 12 pages.
Witte, K. et al, "Advanced Iodine Laser Concepts," IEEE Journal of Quantum Electronics, vol. QE-17, No. 9, Sep. 1981, 8 pages.
Basov, N. at al., "Molecules of CH3I and n-C3F7I as Iodine Atom Donors in a Pulsed Chemical Oxygen-Iodine Laser," Soviet Journal of Quantum Electronics, vol. 14, No. 10, Oct. 1984, 2 pages.
Takehisa, K. et al., "Singlet Oxygen Generator Using a Porous Pipe," Journal of Applied Physics, vol. 61, No. 1, Jan. 1, 1987, 6 pages.
Endo, M. et al., "Chemically Pumped Atomic Iodine Pulse Laser," Applied Physics Letters, vol. 59, No, 8, Aug. 19, 1981, 2 pages.
Qi, Z. et al., "Model for Amplifier of Pulsed Chemical Oxygen-Iodine Laser," 9th International Symposium on Gas Flow and Chemical Lasers, SPIE vol. 1810, Sep. 21, 1992, 4 pages.
Endo, M. et al, "Theoretical Study of a Large Scale Chemically Pumped Pulsed Iodine Laser Amplifier," 9th International Symposium on Gas Flow and Chemical Lasers, SPIE vol. 1810, Sep. 21, 1992, 4 pages.
Yuryshev, N., "Pulsed COIL Review," Iodine Lasers and Applications, SPIE vol. 1980, Sep. 28, 1992, 5 pages.
Qi, Z. et al., "Model for Amplifier of Pulsed Chemical Oxygen-Iodine Laser," Iodine Lasers and Applications, SPIE vol. 1980, Sep. 28, 1992, 4 pages.
Carroll, D., "Chemical Laser Modeling with Genetic Algorithms," AIAA Journal, vol. 34, No. 2, Feb. 1996, 9 pages.
Schall, W. et al., "Fluid Mechanic Aspects for Rotating Disk Generators," 12th International Symposium on Gas Flow and Chemical Lasers and High Power Laser Conference, SPIE vol. 3574, Aug. 31, 1998, 8 pages.
Suzuki, K. et al., "High Pressure Pulsed COIL Assisted with an Instantaneous Production of Atomic Iodine," 13th International Symposium on Gas Flow and Chemical Lasers and High Power Laser Conference, SPIE vol. 4184, Sep. 18, 2000, 4 pages.
Hurlock, S., "COIL Technology Development at Boeing," Gas and Chemical Lasers and Intense Beam Applications III, SPIE vol. 4631, Jan. 20, 2002, 16 pages.
Endo, M. et al., "History of COIL Development in Japan: 1982-2002," Gas and Chemical Lasers and Intense Beam Applications III, SPIE vol. 4631, Jan. 20, 2002, 12 pages.
Yuryshev, N. et al., "Pulsed Mode of COIL," High-Power Laser Ablation IV, SPIE vol. 4760, Apr. 22, 2002, 11 pages.
Endo, M. at al., "High Pressure Pulsed COIL Assisted with an Instantaneous Production of Atomic Iodine II," 14th International Symposium on Gas Flow, Chemical Lasers, and High-Power Lasers, SPIE vol. 5120, Oct. 10, 2003, 8 pages.
Duff, E. et al., "Chemical Oxygen Iodine Laser (COIL) Technology and Development," Laser Technologies for Defense and Security, SPIE vol. 5414, Apr. 12, 2004, 17 pages.
Kodymova, J., "COIL—Chemical Oxygen-Iodine Laser: Advances in Development and Applications," Lasers and Applications, SPIE vol. 5958, Aug. 28, 2005, 11 pages.
Azyazov, V. et al., "A Simplified Kinetic Model for the Coil Active Medium," High Energy/Average Power Lasers and Intense Beam Applications V, SPIE vol. 7915, Jan. 22, 2011, 15 pages.

* cited by examiner

Type-II

PULSED IODINE LASER APPARATUS

INCORPORATION BY REFERENCE

This application is based upon and claims the benefit of priority from Japanese patent application No. 2015-118102, filed on Jun. 11, 2015, the disclosure of which is incorporated herein in its entirety by reference.

BACKGROUND OF THE INVENTION

1. Field of the Invention

The present invention relates to a pulsed iodine laser apparatus.

2. Description of Related Art

Concerning an iodine laser which emits 1.315 µm radiation from an excited iodine atom $I(^2P_{3/2})$, a Chemical Oxygen-Iodine Laser is called a COIL. The COIL is well known to be able to operate at a high power CW (continuous wave) mode. In order to operate the COIL, a singlet oxygen molecule $(O_2(^1\Delta_g))$ is generated from the chemical reaction of chlorine gas with a BHP solution. The BHP solution is a mixed solution of hydrogen peroxide solution $(H_2O_2)$ and potassium hydroxide (KOH) or sodium hydroxide (NaOH). The $O_2(^1\Delta_g)$ is sometimes called singlet oxygen. By mixing the generated $O_2(^1\Delta_g)$ with iodine molecules, iodine molecules are dissociated into iodine atoms. Further, the excited iodine atom $(I(^2P_{3/2}))$ is produced by the energy transfer of $O2(^1\Delta_g)$ to a basic iodine atom (I(2P1/2)). Thus, a COIL runs the laser operation. Stephen C. Hurlick, et al., "COIL technology development at Boeing," Proceedings of SPIE Vol. 4631, 101-115 (2002), Masamori Endo, "History of COIL development in Japan: 1982-2002," Proceedings of SPIE Vol. 4631, 116-127 (2002), Edward A. Duff and Keith A. Truesdell, "Chemical oxygen iodine laser (COIL) technology and development," Proceedings of SPIE Vol. 5414, 52-68 (2004) and Jarmila Kodymova, "COIL-Chemical Oxygen Iodine Laser: advances in development and applications," Proceedings of SPIE Vol. 5958, 595818 (2005) explain about the COIL.

Most COILs operate in a CW (Continuous Wave) mode. While there is another type of iodine laser having the same oscillation wavelength as that of the COIL, this laser uses alkyl iodine such as $CF_3I$, $C_2F_5I$, $n-C_3F_7I$, or $i-C_3F_7I$. Extensive research on this type of iodine laser has been conducted since in the 1960s. This alkyl iodine is irradiated with Ultraviolet pulsed radiation from a Xe flashlamp. By doing so, iodine molecules can be easily dissociated into iodine atoms. Since the iodine atoms are in an excited state, laser oscillation is possible. This type of iodine laser is called a flashlamp-excited iodine laser, or a photo-dissociated iodine laser. A flashlamp-excited iodine laser is known to be able to produce a giant pulse. Therefore, large laser systems have been developed for the purpose of realizing inertial confinement fusion (ICF). Klaus J. Witte, Ernst Fill, Gunter Brederlow, Horst Baumhacker, and R. Volk, "Advanced Iodine Laser Concepts," IEEE Journal of Quantum Electronics, Vol. QE-17, 1809-1816 (1981) explains about this.

However, in order to make the scale of the flashlamp-pumped iodine laser large, many large flashlamps are necessary. Furthermore, a large pulsed-power electric supply is necessary. Accordingly, the laser apparatus becomes complicated and thus upsizing of the apparatus become a problem. Therefore, a pulsed iodine laser based on the COIL, whose scale can be made larger more easily than that of the flashlamp-pumped iodine laser, has been developed. M. Endo, K. Shiroki, and T. Uchiyama explain about this in "Chemically pumped atomic iodine pulse laser," Appl. Phys. Lett. Vol. 59, 891-892 (1991) explains. Also, in order to laser oscillation efficiently, a hybrid system has been investigated. The hybrid system uses a mixture of alkyl iodine and a singlet oxygen, and flashlamps. N. G. Basov, N. P. Vagin, P. G. Kryukov, D. Kh. Nurligareev, V. S. Pazyuk, and N. N. Yuryshev, "Molecules of $CH_3I$ and $n-C_3F_7I$ as iodine atom donors in a pulsed chemical oxygen-iodine laser," Soviet Journal of Quantum Electronics, Vol. 14, 1275-1276 (1984), N. N. Yuryshev, "Pulsed COIL review," Proceedings of SPIE Vol. 1980, 181-185 (1992), Nikolai N. Yuryshev, Nikolai P. Vagin, "Pulsed Mode of COIL," Proceedings of SPIE Vol. 4760, 515-525 (2002), Kenji Suzuki, Kozo Minoshima, Daichi Sugimoto, Kazuyoku Tei, Masamori Endo, Taro Uchiyama, Kenzo Nanri, Shuzaburo Takeda, and Tomoo Fujioka, "High pressure pulsed COIL assisted with an instantaneous production of atomic iodine," Proceedings of SPIE Vol. 4184, 124-127 (2001) and Masamori Endo, Kozo Minoshima, Koichi Murata, Oleg Vyskubenko, Kenzo Nanri, Shuzaburo Takeda, and Tomoo Fujioka, "High pressure pulsed COIL assisted with an instantaneous production of atomic iodine II," Proc. SPIE 5120, 397-404 (2003) explain about this.

Since the purpose of these conventional pulsed iodine lasers is to realize ICF, the pulse width is in the picoseconds order, and around 10 ns at the longest. Although an amplifier is necessary to increase the output energy, single-pass amplification could not extract the output energy efficiently. Therefore, multi-pass amplification has been investigated, in which an input beam is propagated in the same amplifier many times. Zhuang Qi, Feng Hao, Wang Chengdong, Sha Guohe, Zhang Cunhao, "Model for amplifier of pulsed chemical oxygen-iodine laser," Proceedings of SPIE Vol. 1980, 198-201 (1992), Zhuang Qi, Feng Hao, Wang Chengdong, Sha Guohe, Zhang Cunhao, "Model for amplifier of pulsed chemical oxygen-iodine laser," Proceedings of SPIE Vol. 1810, 501-504 (1992) M. Endo, K. Kodama, Y. Handa, and T. Uchiyama, "Theoretical study of a large scale chemically pumped pulsed iodine laser amplifier," Proceedings of SPIE Vol. 1810, 532-535 (1992) explain about the multi-pass amplification for the iodine laser amplifier.

SUMMARY OF THE INVENTION

However, the pulse width of the conventional pulsed iodine lasers is quite short. Accordingly, the laser beam generates plasma in the air because of its high peak power. Once plasma is generated, the laser beam cannot be propagated any farther. Therefore, it was difficult for the conventional pulsed iodine laser to be propagated a long distance in the air.

It has been clarified by the present inventor that it is desirable to use a pulse width of longer than 10 microseconds in order to propagate a long distance in the air. The reason for this is as follows. If a laser beam is focused at a target 10-30 km away, the focused size of the laser beam is around 10 $cm^2$ at the target even if the laser beam has a good beam quality. In order to make a hole with a 10 $cm^2$ area in a 2 mm thickness aluminum sheet, 70 kJ of energy is necessary. This laser energy is equal to the evaporation energy of the volume of the aluminum sheet for the size of the hole. Meanwhile, it is considered that the peak power density of the laser needs to be less than around 1 $MW/cm^2$ to suppress generation of air plasma. Consequently, the pulse width of the laser beam needs to be longer than 7 microseconds.

An iodine laser amplifier for amplifying the iodine laser with a pulse width in an order of microseconds has not previously been investigated enough. This is because the conventional large-energy pulsed iodine laser was investigated for the purpose of realizing ICF, in which the pulse width was considered to be 10 ns at the longest. Therefore, it has not been clarified what is an efficient iodine amplifier for amplifying the iodine laser with the pulse width in an order of microseconds. Moreover, it has not been clarified whether the conventional multi-pass amplification is effective for amplifying the long pulse laser. Also in the case of a COIL, almost no investigation of the pulsed operation itself has previously been conducted. Though M. Endo, K. Shiroki, and T. Uchiyama, "Chemically pumped atomic iodine pulse laser," Appl. Phys. Lett. Vol. 59, 891-892 (1991) explains about a pulsed COIL, it is an oscillator. So a pulsed COIL amplifier for the iodine laser with a long pulse has not been previously investigated.

The purpose of the present invention is to realize an efficient pulsed iodine laser A pulsed iodine laser according to one aspect of the present invention includes a flashlamp-pumped iodine laser oscillator which produces a laser pulse with a full pulse width of 1 microsecond or longer; and an iodine laser amplifier which employs a singlet oxygen generator (SOG) and amplifies the laser pulse.

The above-mentioned amplifier may employ a gas tank which contains chlorine gas, and a gas tank which contains iodine molecules. Also the amplifier may employ a controller which controls an emission timing of the flashlamp radiation, an injection timing of the chlorine gas into the singlet oxygen generator, and an injection timing of the iodine molecules into a chamber of the iodine laser amplifier.

The above-mentioned injection timing of the iodine molecules into the chamber may be delayed from the injection timing of the chlorine gas into the SOG.

The above-mentioned injection timing of the iodine molecules into the chamber may be controlled based on an intensity of spontaneous emission from singlet oxygen which the chamber of the iodine laser amplifier is filled with.

The above-mentioned injection timing of the iodine molecules into the chamber may be controlled based on a pressure of oxygen which the chamber of the iodine laser amplifier is filled with.

A cross-section of the laser pulse in the amplifier may be increased with increasing a propagation distance in the chamber.

A pulsed iodine laser apparatus according to another embodiment includes an iodine laser oscillator which has a singlet oxygen generator; an iodine laser amplifier which has a singlet oxygen generator and amplifies a pulsed laser from the iodine laser oscillator; and a controller which controls a timing of injecting iodine molecules into a chamber of the iodine laser oscillator, and a timing of injecting iodine molecules into a chamber of the iodine laser amplifier.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

In order to achieve the above purpose, first a pulsed COIL amplifier, which is similar to the COIL shown in M. Endo, K. Shiroki, and T. Uchiyama, "Chemically pumped atomic iodine pulse laser," Appl. Phys. Lett. Vol. 59, 891-892 (1991), was simulated. The present simulation is based on a rate equation in consideration of the chemical reactions shown in V. N. Azyazov, S. Yu. Pichugin, M. C. Heaven, "A simplified kinetics model for the COIL active medium," Proceedings of SPIE Vol. 7915, 791505 (2011). Since the reactions include iodine molecule dissociation, the simulation is considered to simulate the experiment quite well. The calculations of gain and pressure broadening coefficients are referred to by David L. Carroll, "Chemical Laser Modeling with Genetic Algorithms," AIAA Journal, Vol. 34, 338-346 (1996). The simulation uses a one-directional division model for the amplifier along the optical axis.

The simulation conditions are as follows.

Chlorine gas flow rate: 100 mol/s/m$^3$
Iodine molecule flow rate: 10 mol/s/m$^3$
Helium gas flow rate: 100 mol/s/m$^3$
Input beam temporal profile: Sinusoidal (Half the period of plus side)
Full pulse width: 100 microseconds
Input beam intensity: 1.0 J/cm$^2$
Amplification length: 10 m
Time division: 10 ps
Spatial division: 10 cm Buffer gas used to inject the iodine molecules into the amplifier is assumed to be helium. The helium gas flow rate is assumed to be 10 times larger than that of the iodine molecules. The amplification length of the amplifier is assumed to be 10 m. Under the above conditions, amplification for amplifying the input beam with the full pulse width of 100 microseconds is calculated. However, the calculation result shows that the input beam is scarcely amplified.

Therefore, the simulation code was improved. Specifically, the simulation takes into consideration that the iodine molecules are injected with a little delay from a starting time of the singlet oxygen injection into the amplifier. In the simulation, this delay time (defined as Delay1) is increased from 0 sec. gradually. At each delay time, the input beam is programmed to be incident on the amplifier with a delay from the start time of the injection of the iodine molecules.

Figure 1:
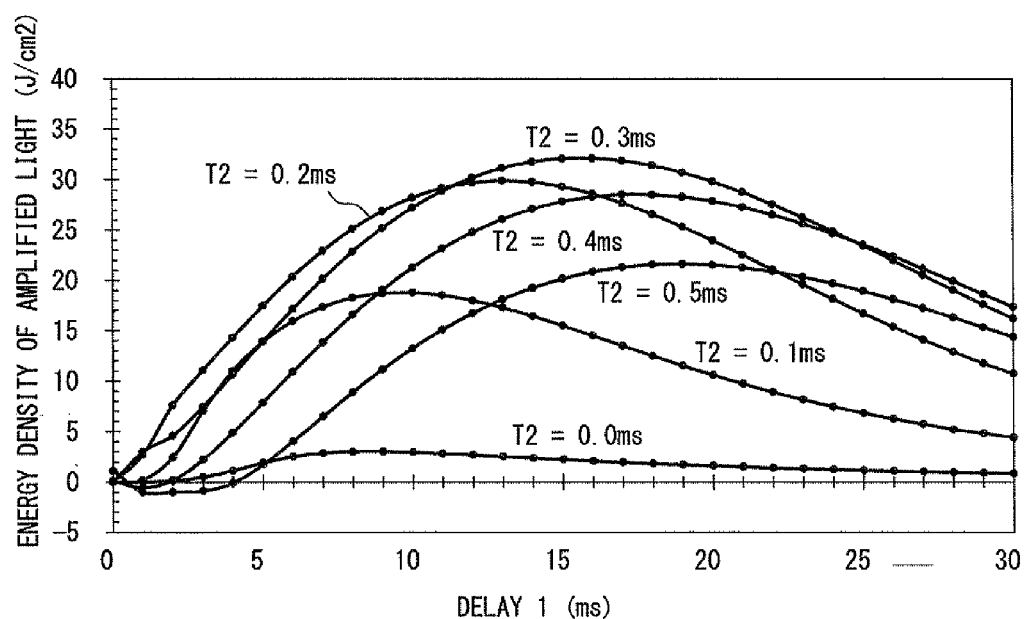
FIG. 1 is a graph showing simulation results of the amplified energy density as a function of the Delay1.

This delay time of the input beam is defined as Delay2. The amplified energy, which is defined as energy calculated by subtracting the input beam energy from the output energy, is calculated with different Delay1 and Delay2. The simulation results are shown in FIG. 1. Though energy density of the amplified beam is shown in the graph, it is simply called amplified energy. The graph shows that around 15 ms of the Delay1 and around 0.3 ms of the Delay2 give a high amplified energy. The graph clearly shows that if the singlet oxygen and iodine molecules start to be injected at the same time, in which the Delay1 is 0s, the input beam is scarcely amplified.

In a conventional flashlamp-pumped iodine amplifier, it is considered that multi-pass amplification is necessary to extract the energy efficiently. In order to confirm this by the simulation, a COIL amplifier is simulated with a parameter of the input beam pulse width. The extraction efficiency is calculated as a function of the Delay2 with a constant Delay1 of 15 ms. The result shown in FIG. 2 indicates that the amplified efficiency decreases as the pulse width is shortened. Therefore it is clarified that longer than 1 microsecond is necessary to efficiently amplify the input beam by a single pass. Since a pulsed iodine laser apparatus according to the embodiment uses the pulse width of around 100 microseconds, it is confirmed that the multi-pass amplifier used in the conventional amplifier is not necessary.

By the way, the amplified efficiency η is the value defined as the following eq. (1).

$$\eta(\%) = \frac{\text{Amplified energy destiny}(J/m^2)}{\text{Final oxygen pressure}(Pa) \times 0.80 \times L(m) \times K} \times 100 \quad (1)$$

Namely, the amplified efficiency η is the ratio of the amplified energy of the output beam to the energy of the total singlet oxygen injected into the amplifier. L is the amplifier length (unit: m), K is a constant being 37.8 (unit: $J/m^3$). The value of 0.80 in eq. (1) is the initial yield of the singlet oxygen out of the total oxygen, which is assumed to be 80%.

Figure 3:
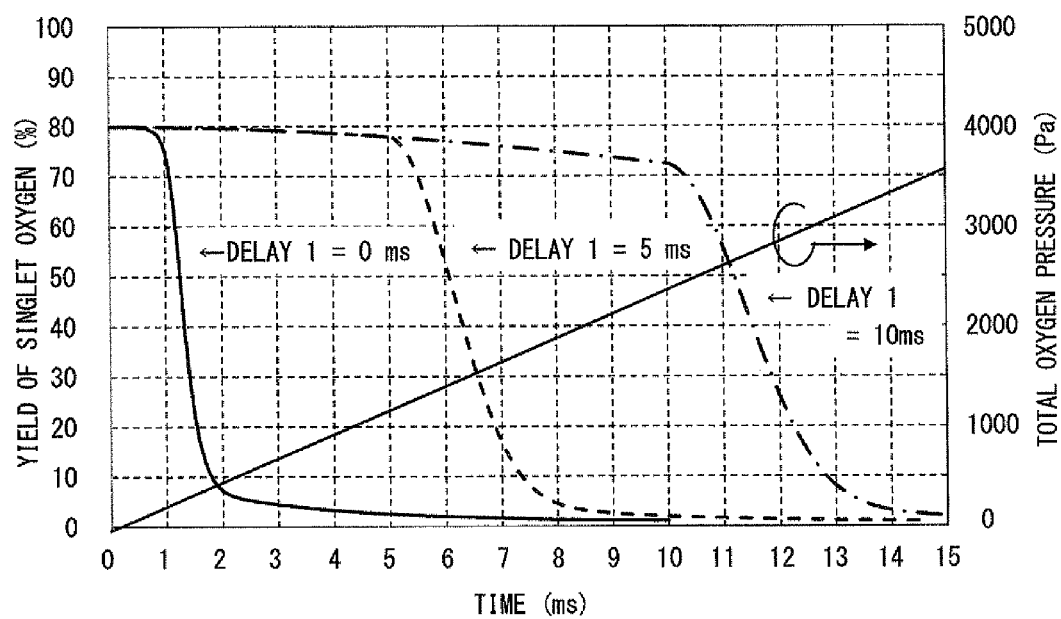
FIG. 3 is a graph showing simulation results of a yield of singlet oxygen as a function of time.

In order to investigate the reason for having an optimum Delay1, another simulation is performed. Specifically, a yield of the singlet oxygen is calculated without inputting the beam into the amplifier. Namely, a ratio of a partial pressure of the singlet oxygen molecules to a total pressure of oxygen molecules is calculated as the yield of the singlet oxygen. The calculation result is shown in a graph in FIG. 3. Three different delays for the Delay1 are taken as a parameter. The graph clearly shows that the yield of the single oxygen rapidly decreases immediately after injection of the iodine molecules is started. That is, it is considered that the single oxygen decreases rapidly after the iodine molecule injection since the energy of the singlet oxygen is used to dissociate the iodine molecules.

By the dissociation of the iodine molecules, excited iodine atoms are generated. But since the lifetime of the excited iodine atoms is short, they are deactivated quickly. This implies that in order to amplify efficiently, the input beam should be incident on the amplifier immediately after the excited iodine atoms are generated. Meanwhile, the iodine atom density becomes higher as the singlet oxygen pressure becomes higher. Therefore, in order to increase the amplified efficiency, it is preferable that the amplifier be filled with the singlet oxygen at a high pressure. Consequently, when the iodine molecules are injected after the pressure of the singlet oxygen reaches a predetermined level, it is considered that the amplified energy can be made high.

This does not mean that the longer the Delay1 becomes, the higher the amplified energy becomes. A partial pressure of the singlet oxygen increases as the Delay1 becomes longer. Therefore, in a high singlet oxygen pressure condition, the probability of the deactivation of the singlet oxygen by the collision of the singlet oxygen and/or the collision of other gas molecules is increased. Consequently, there is an upper limit in the Delay1, and there is an optimum Delay1 to maximize the amplified energy. Therefore, the iodine molecules should be injected at the time when the density of the singlet oxygen, which the amplifier is filled with, reaches its maximum, the reaching of which maximum is determined by monitoring the density.

One method to monitor the density is to mount a small window on a chamber of the amplifier, and mount a photo diode (PD) near the window. Then, the spontaneous emission of a 1.27 μm wavelength from the singlet oxygen can be monitored by the PD. In this case, injection of the iodine molecules should be started at the time that the increasing rate of the emission intensity becomes lower than a predetermined value.

Another method to monitor the density is to monitor the pressure of the total amount of oxygen molecules which the chamber is filled with. In this case, injection of the iodine molecules should be started at the time that the total oxygen pressure reaches a predetermined level. The pressure gauge monitors not only a partial pressure of the singlet oxygen, but also a total pressure of oxygen. But since the time-dependent yield of the singlet oxygen can be determined by some experiments, the partial pressure of the singlet oxygen can be determined by monitoring the total pressure of oxygen.

The input beam should be incident to the amplifier with the Delay2 which should be longer than 0 s. It is required to fill the amplifier with a predetermined number of the iodine molecules. Although the optimum Delay2 depends on the flow rate of the iodine molecules, it is at least longer than 0s. In the case of injecting the iodine molecules at 10 $mol/s/m^3$, Delay2 of 0.1-0.5 ms is desirable. This desirability is clarified by the simulation result explained later. Since the Delay2 is inversely proportional to the flow rate, the Delay2 (ms) of 1/M to 5/M is desirable, where M is the iodine molecule flow rate ($mol/s/m^3$). By the way, the Delay1 and the Delay2, referred to in the present invention, are based on the actual timing that each gas enters the amplifier, and they do not include other delay times, such as a delay time generated in the controller and/or generated in signal cables.

As explained above, the simulation results have clarified the following points. In the case of a long pulse with longer than 1 microsecond, multi-pass amplification is not necessary. When based on the injection time of the singlet oxygen, the start time for injecting the iodine molecules into the amplifier and the time that the input beam is incident on the amplifier need to be properly delayed. In order to realize this, oscillation timing at the oscillator needs to be precisely controlled.

This is why the laser apparatus according to the embodiment employs a flashlamp-pumped iodine laser as the oscillator. Its oscillation timing has a constant delay time from the flashlamp radiation. And the flashlamp radiation timing can be precisely controlled by the trigger of the electric circuit which flashes the flashlamp. M. Endo, K. Shiroki, and T. Uchiyama, "Chemically pumped atomic iodine pulse laser," Appl. Phys. Lett. Vol. 59, 891-892 (1991) explains a pulsed COIL which is based on an instant generation of the singlet oxygen. However, since the laser apparatus according to the embodiment employs a flashlamp-pumped iodine laser, the oscillation timing can be controlled more precisely than that of the COIL.

As mentioned above, the pulsed iodine laser of this embodiment employs a flashlamp-pumped iodine laser as its oscillator. Therefore, the excited iodine atoms are generated by a different method from that in which the COIL is used. However, since both lasers oscillate or amplify the 1.315 µm-wavelength radiation emitted from excited iodine atoms, there is no need to tune the oscillation wavelength at the oscillator, which is one of the features of the embodiment. Whereas, if a wavelength-tunable infrared solid-state laser is employed as the oscillator, it needs a wavelength selector and a wavelength stabilizer in order to tune the oscillation wavelength at precisely 1.315 µm.

Figure 4:
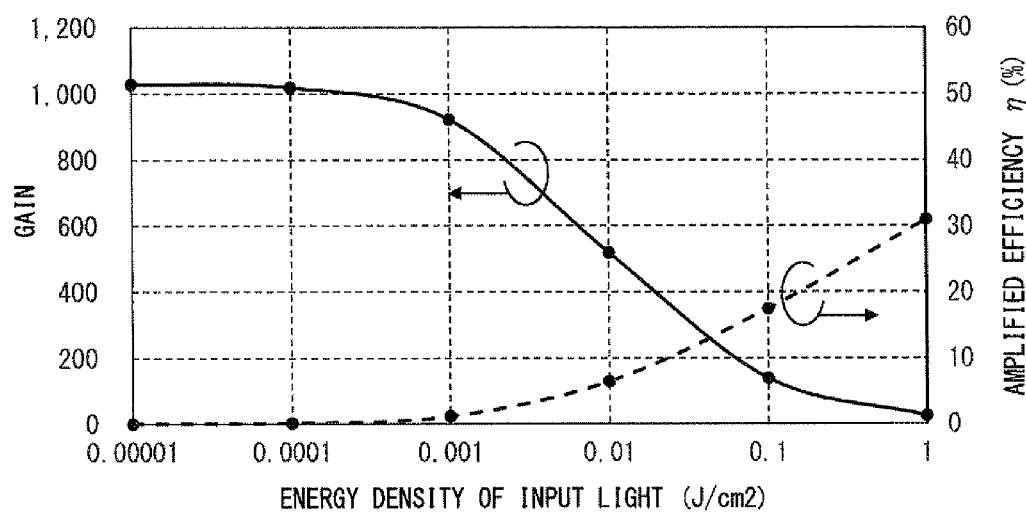
FIG. 4 is a graph showing simulation results of an amplified gain as a function of an input beam energy density.

The simulation result in the case of selecting the optimum timing explained above is shown in FIG. 4. Although the optimum timing is used, the amplified efficiency cannot be very high. From the simulation, the maximum efficiency is found to be around 30%. Since the gain and the amplified efficiency conflict with each other, a high input energy is necessary to obtain a high amplified efficiency in spite of a low gain. Obtaining a high input energy from an oscillator is difficult. Therefore, a multistage amplifier is necessary.

Therefore, in the embodiment, the beam cross-section profile can be shaped in order to achieve both a high gain and a high amplified efficiency. Specifically, the beam incident on the amplifier may have a gradually increasing cross section as it propagates in the amplifier. Therefore, the beam cross section of the incident beam may be shaped before it comes into the amplifier. This enables the beam cross section near the input side of the amplifier to be decreased. Consequently, efficient amplification is possible since the beam intensity can be high near the input side even if the input beam energy is small.

Although such a technique of increasing the beam cross section in the amplifier can be easily applied to a light-pumped laser such as a dye laser and a solid-state laser, it is difficult to apply it to a large gas laser, except a COIL, whose beam cross section is as much as 1 m². The reason is explained as follows.

It is well known that a high-power gas laser such as a $CO_2$ laser and an excimer laser can use a large amplifier. Since these lasers can operate by discharge pumping, a cross section of each of their amplifiers should be constant in order to achieve a homogeneous discharge in the amplified medium. On the other hand, in the case of a COIL, the amplifier is only filled with the singlet oxygen and iodine molecules as the laser medium. Therefore, the amplifier can have any geometrical shape. Consequently, the cross section of the amplifier along the optical axis can be easily increased. Therefore, it is possible to superimpose the input beam having the increased cross section upon the cross section of the amplifier.

Exemplary embodiments of the present invention are explained with reference to the attached drawings. The exemplary embodiments explained below are merely examples of the present invention, and the present invention is not limited to these exemplary embodiments. Note that components denoted by the same reference numerals in the specification and drawings indicate the same components.

First Embodiment

Figure 5:
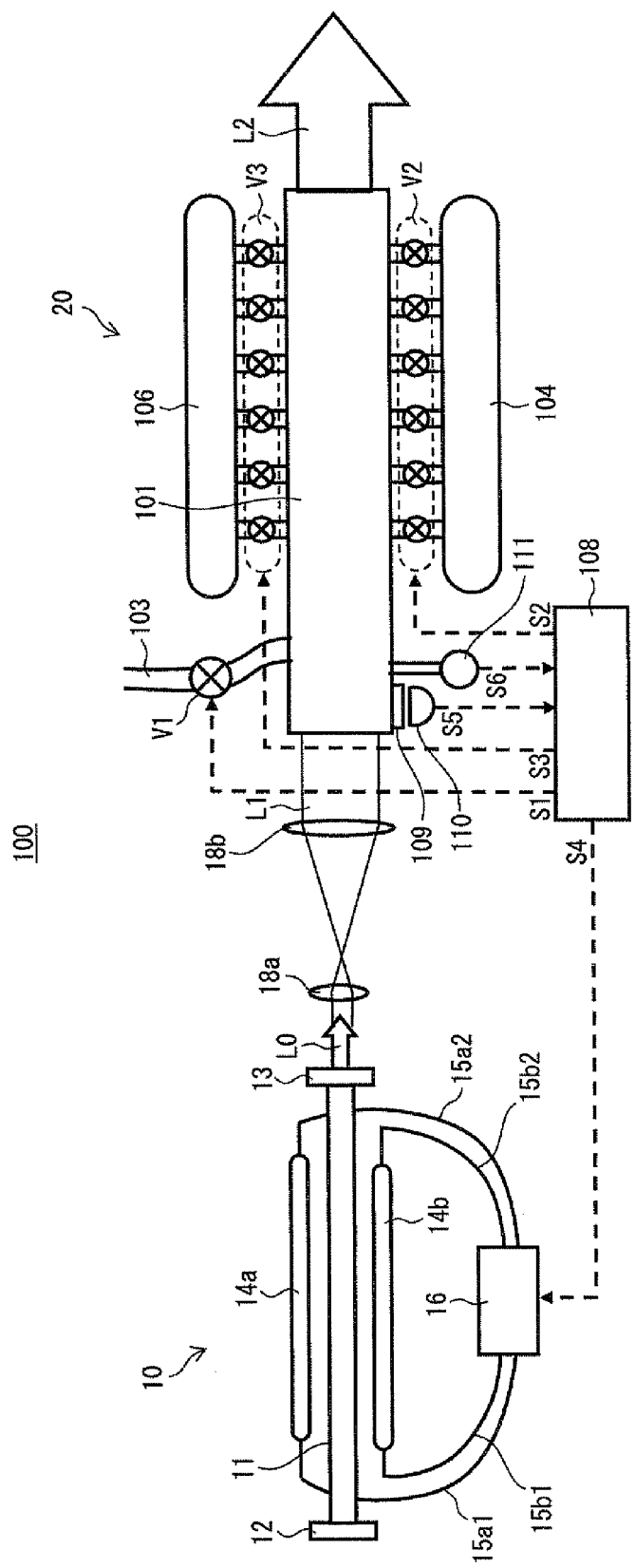
FIG. 5 is a schematic drawing of a pulsed iodine laser 100 according to the embodiment 1.

Hereinafter, the first embodiment of the present invention is described with FIG. 5. FIG. 5 is a schematic drawing of a pulsed iodine laser 100 according to the first embodiment.

The pulsed iodine laser 100 is a MOPA (Master Oscillator and Power Amplifier) system. A flashlamp-pumped iodine laser oscillator 10 is the master oscillator, and a COIL amplifier 20 is the power amplifier.

The laser beam L0 extracted from the flashlamp-pumped iodine laser oscillator 10 propagates through two convex lenses 18a and 18b. The convex lenses 18a and 18b enlarge the beam diameter of the laser L0 (referred to laser L1). The laser L1 enters an amplifier chamber 101 of the COIL amplifier 20. Then the amplified laser L2 is extracted from the COIL amplifier 20.

In the flashlamp-pumped iodine laser oscillator 10, vapor of $n$-$C_3F_7I$ as an iodine compound is filled in the laser tube 11 which is made of transparent quartz glass. The laser tube 11 employs a total reflector 12 and an output mirror 13. Near the laser tube 11, two Xe flashlamps 14a and 14b are placed. The Xe flashlamp 14a has power cables 15a1 and 15a2 which are connected to a power supply 16. The Xe flashlamp 14b has power cables 15b1 and 15b2 which are connected to the power supply 16.

When a trigger signal S4 is input to the power supply 16, a large pulsed electric current flows through the power cables 15a1, 15a2, 15b1 and 15b2. Then the Xe flashlamps 14a and 14b flash. The trigger signal S4 is supplied from the controller 108 which controls both the flashlamp-pumped iodine laser oscillator 10 and the COIL amplifier 20.

Figure 6:
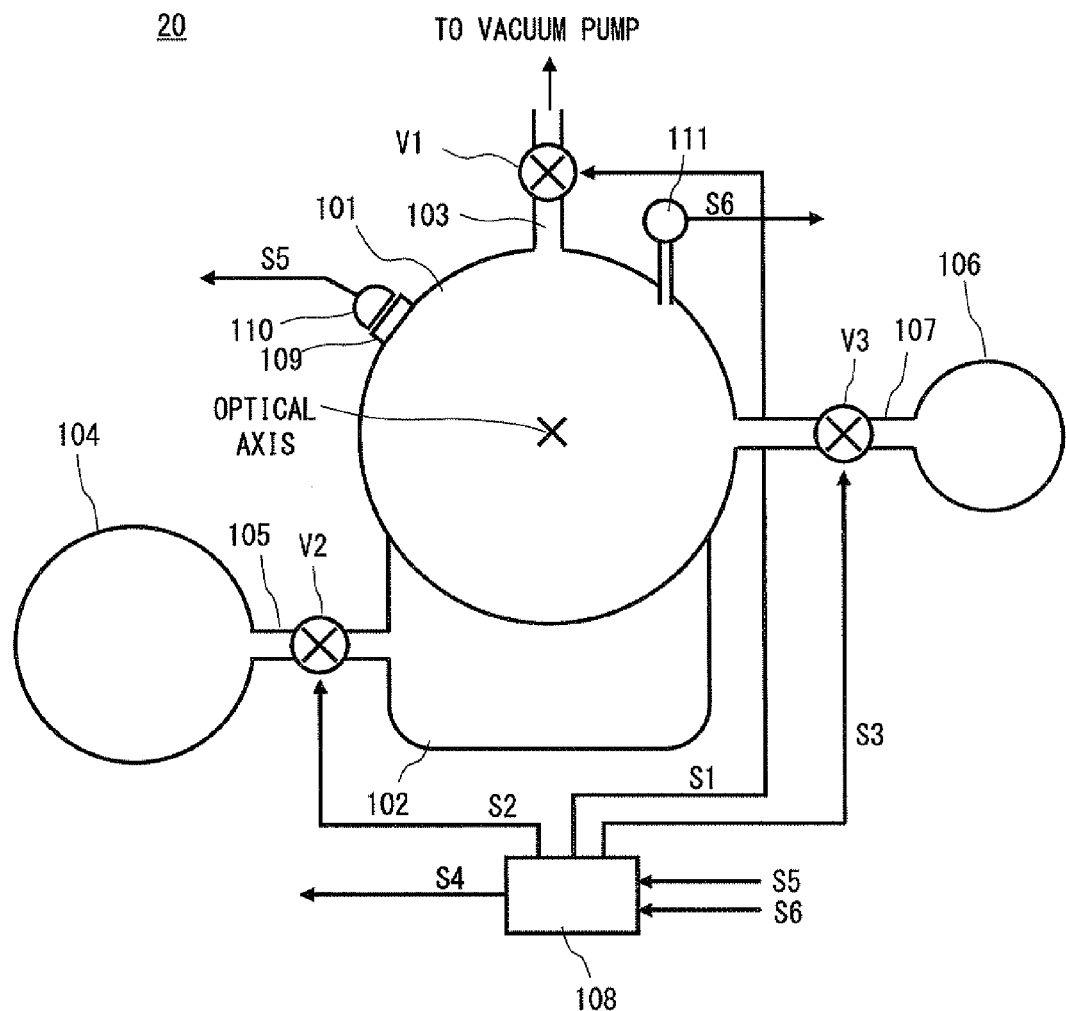
FIG. 6 is a schematic graph of a COIL amplifier 20 of the pulsed iodine laser 100.

The COIL amplifier 20 has an amplifier chamber 101, a SOG 102, a high-pressure chlorine tank 104, and an iodine molecule tank 106 (see FIG. 6 also). The amplifier chamber 101 is filled with the amplified medium. As shown in FIG. 6, the SOG 102 is located under the amplifier chamber 101. The high-pressure chlorine tank 104 supplies chlorine gas to the SOG 102. Specifically, supply tubes 105 connect the high-pressure chlorine tank 104 to the SOG 102. The supply tubes 105 are equipped with electromagnetic valves. All these electromagnetic valves mounted in the supply tubes 105 are referred to as a valve V2. Open or close of the valve V2 is controlled by an open/close signal S2 from the controller 108.

The amplifier chamber 101 is connected to the iodine molecule tank 106 by supply tubes 107. Thus the iodine molecule tank 106 can inject the iodine molecules into the amplifier chamber 101 through the supply tubes 107. Each supply tube 107 has an electromagnetic valve. All the electromagnetic valves mounted in the supply tubes 107 are referred to as a valve V3. Open or close of the valve V3 is controlled by an open/close signal S3 from the controller 108.

The COIL amplifier 20 also has an exhaust tube 103 in order that the air can be pumped out from the amplifier chamber 101 before the laser operation. Thus the exhaust tube 103 is connected to a vacuum pump which is not drawn. The exhaust tube 103 has a valve V1. Open/close operation of the valve 1 is controlled by an open/close signal S1 from the controller 108. Before the laser operation, the COIL amplifier 20 is pumped out by opening the valve V1. After the COIL amplifier 20 is pumped out, the valve V1 is closed. Then, the valve V2 is opened, and chlorine gas is injected into the SOG 102 from the high-pressure chlorine tank 104. Consequently, singlet oxygen is generated in the SOG 102, and the amplifier chamber 101 is filled with the singlet oxygen.

A small quartz window 109 is attached to the side of the amplifier chamber 101. A PD (photo diode) 110 is mounted near the quartz window 109. The PD 110 can monitor the intensity of 1.27 µm-wavelength spontaneous radiation generated from the singlet oxygen in the amplifier chamber 101.

The PD 110 outputs a monitoring signal S5, which corresponds to the radiation intensity, to the controller 108. The controller 108 outputs open/close signals S1-S3 which control the open/close timing of the valves V1-V3. The controller 108 outputs a trigger signal S4 to the power supply 16 to control the operation timing of the power supply 16.

The intensity of the monitoring signal S5 from the PD 110 increases linearly at first. Then the increasing rate of the intensity gradually decreases, and the intensity is saturated. The reason for this is as follows. If the pressure of the singlet oxygen in the amplifier chamber 101 becomes too high, the collisional deactivation between the singlet oxygen increases. This means there is the limit to the amount of the singlet oxygen which the amplifier chamber 101 is filled with.

Therefore, in this embodiment, the changing rate of the intensity of the monitoring signal S5 is calculated. And when the changing rate becomes lower than a predetermined value, injection of the iodine molecules is started. Specifically, when the changing rate becomes lower than a threshold value, the controller 108 outputs an open/close signal S3 to the valve V3 to open it. Thus the controller 108 controls the valve V3 according to the monitoring signal S5.

As explained above, in this embodiment, the intensity of the spontaneous emission from the singlet oxygen which the amplifier chamber 101 is filled with is monitored by PD110. And the controller 108 controls the timing of the open/close signal S3 according to the intensity of the spontaneous emission. Or the controller 108 can control the timing of the open/close signal S3 according to the pressure of the amplifier chamber 101.

The controlling mechanism of the valve V1, which opens or closes according to the pressure, is explained as follows. The amplifier chamber 101 is equipped with a pressure gauge 111. The pressure gauge 111 monitors the pressure of the total oxygen which the amplifier chamber 101 is filled with. Then, the pressure gauge 111 outputs a monitoring signal S6 to the controller 108. The controller 108 outputs an open/close signal S3 according to the monitoring signal S6. Specifically, the controller 108 controls the valve V3 at the moment when the pressure reaches a predetermined value.

The COIL amplifier 20 is farther explained with FIG. 6. FIG. 6 is a cross-sectional schematic drawing of the COIL amplifier 20, which is perpendicular to the optical axis. The COIL amplifier 20 has the amplifier chamber 101. The SOG 102 is located under the amplifier chamber 101. The supply tubes 105 connect the high-pressure chlorine tank 104 to the SOG 102. The chlorine gas is supplied to the SOG 102 from the high-pressure chlorine tank 104. Consequently, the COIL amplifier 20 performs the laser operation.

The amplifier chamber 101 and the iodine molecule tank 106 are connected through the supply tubes 107. The iodine molecule tank 106 is filled with iodine molecules and helium as a buffer gas. By opening the valve V3 at the supply tubes 107, the iodine molecules and helium are injected into the amplifier chamber 101. Immediately after opening the valve V2 and the valve V3, the laser L1 enters the amplifier chamber 101. For the SOG 102, a porous pipe type SOG can be used, which is explained in K. Takehisa, N. Shimizu, and T. Uchiyama, "Singlet oxygen generator using a porous pipe," Journal of Applied Physics, Vol. 61, 68-73 (1987). Or a rotating disk type SOG can be used for the SOG 102, which is explained in Wolfgang O. Schall, I. Plock, K. Grünewald, J. Handke, "Fluid Mechanic Aspects for Rotating Disk Generators," Proceedings of SPIE Vol. 3574, 265-272 (1998).

The full pulse width of the laser L1 is 100 mircoseconds. Before the laser L1 comes into the COIL amplifier 20, the valve V2 opens. Specifically, 15.3 ms before the laser comes into the COIL amplifier 20, the valve V2 is opened by the open/close signal S2 from the controller 108. Consequently, chlorine gas from the high-pressure chlorine tank 104 is injected into the SOG 102 through the supply tube 105. Then the singlet oxygen ($O_2(^1\Delta_g)$) is generated, and the amplifier chamber 101 is filled with the singlet oxygen. The yield of the singlet oxygen in the SOG 102 is 80%.

Figure 2:
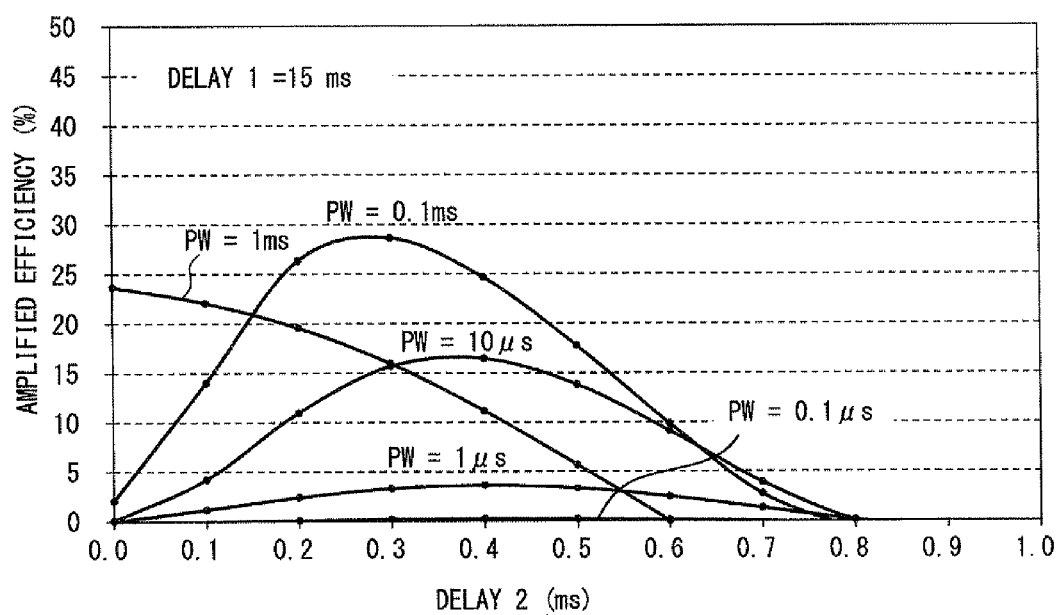
FIG. 2 is a graph showing simulation results of the amplified efficiency as a function of the Delay2.

Immediately after opening the valve V2, the valve V3 is opened by the open/close signal S3 from the controller 108. Specifically, the valve V3 is opened 15.0 ms after the valve V2 is opened. This means the Delay1 is 15.0 ms. At this moment, the iodine molecules and helium are injected into the amplifier chamber 101 through the supply tubes 107. Then the amplifier chamber 101 is filled with iodine molecules and helium, and they are mixed with the singlet oxygen. The laser L1 enters the amplifier chamber 101 after injection of the iodine molecules into the amplifier chamber 101 is started. Specifically, the laser L1 enters the amplifier chamber 101 0.3 ms after the iodine molecules are injected. This means the Delay2 is 0.3 ms. Consequently, the laser L1 is efficiently amplified as shown in FIG. 2.

Figure 7:
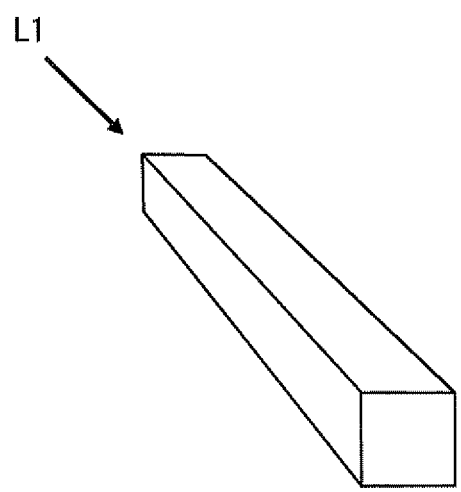
FIG. 7 is a schematic drawing of an amplifier.
Figure 8:
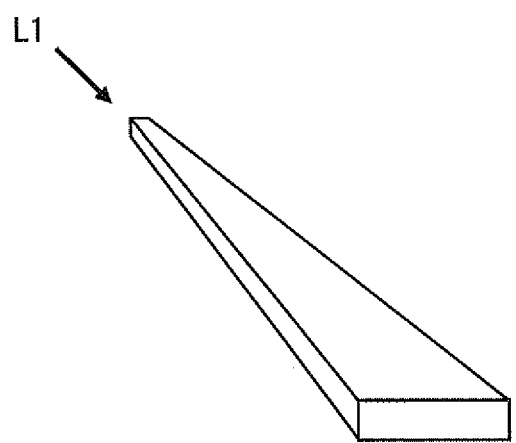
FIG. 8 is a schematic drawing of an amplifier.
Figure 9:
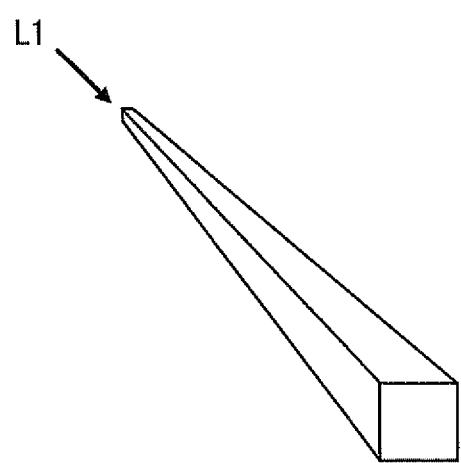
FIG. 9 is a schematic drawing of an amplifier.

Another embodiment of the present invention for the pulsed COIL amplifier 20 is explained using FIG. 7-9, in which a single-stage amplifier can give both a high gain and high amplified efficiency, without using a complicated multistage amplifier. FIGS. 7 to 9 are perspective drawings of the shape of the amplifier medium.

In this embodiment, the beam cross section of the incident laser L1 gradually increases in the amplifier. FIG. 7 shows a conventional amplifier for comparison. Specifically, the conventional amplifier has a cuboid shape (Type-0) in order that a parallel beam may be incident thereto. FIG. 8 shows a shape of Type-I, and FIG. 9 shows a shape of Type-II. In the Type-I amplifier, the beam cross section of the incident laser increases in a single direction (width direction). Whereas, in the Type-II amplifier, the beam cross section increases in two directions (width direction and height direction). The amplification performances are simulated for the three different shapes.

Figure 10:
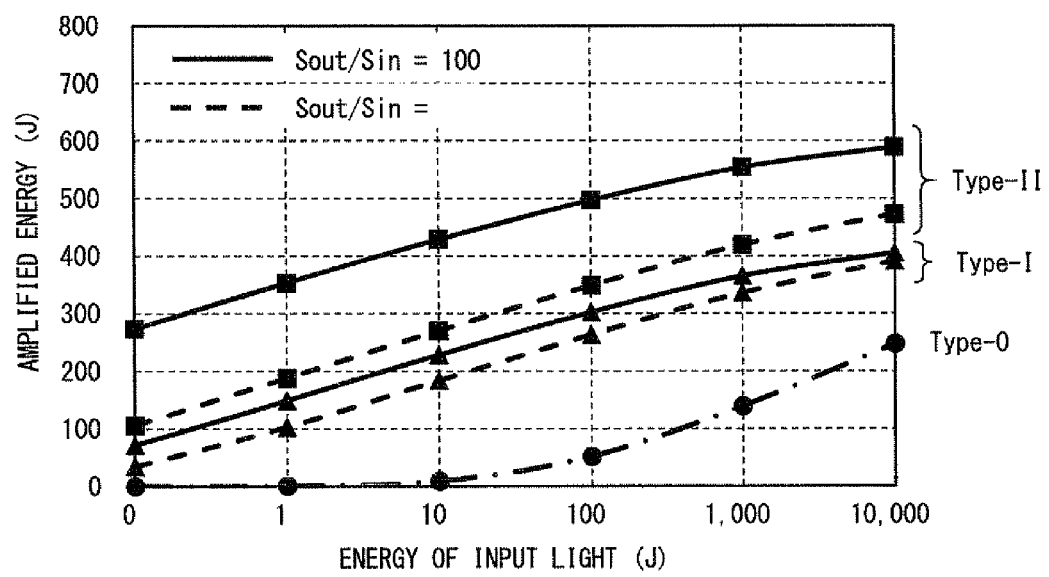
FIG. 10 is a graph showing simulation results of the amplified energy as a function of the input beam energy.

The common conditions of simulation are as follows. The exit beam cross section is 1 m$^2$. The amplifier volume is 10 m$^3$. The amplified energy is calculated as a function of the input beam energy. Concerning the Type-I and Type-II, a beam-cross-section ratio, defined as a value of the output-side beam cross section of the amplifier (Sout) divided by the input-side beam cross section of the amplifier (Sin), is changed as a parameter. The simulation result is shown in FIG. 10. It clearly indicates that both the Type-I and Type-II give much larger amplified energy than that of the Type-0, regardless of the input beam energy. It also clearly indicates that the Type-II gives larger amplified energy than that of the Type-I.

Figure 11:
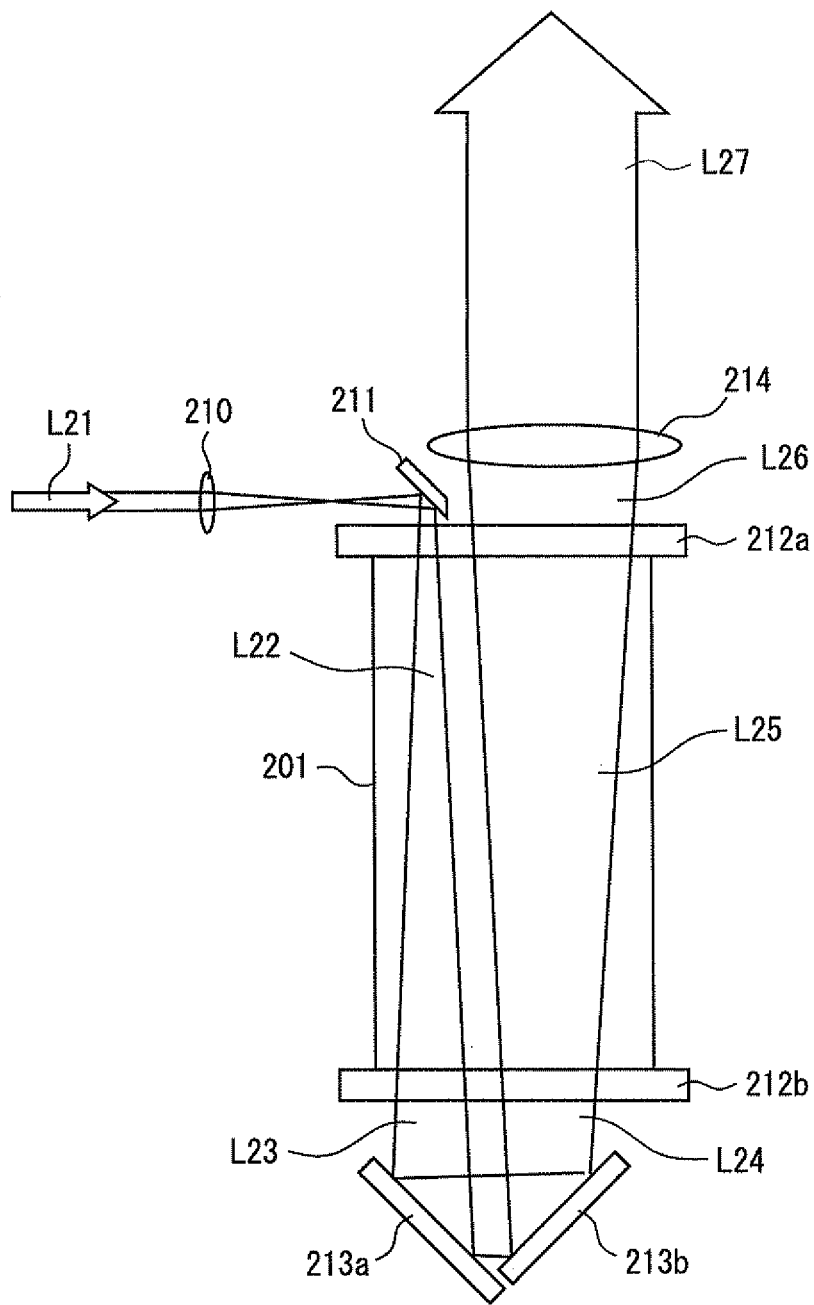
FIG. 11 is a schematic drawing of a COIL amplifier 200.

However, in order for the Type I and the Type 11 to have the same amplifier volume as that of Type-0, the length of the amplifier has to be extended. Therefore, another embodiment of an amplifier of the Type-I or the Type-II which enables the length of the amplifier to be reduced is explained with FIG. 11. FIG. 11 is a schematic drawing of a COIL amplifier 200. It is a cross-sectional schematic drawing of the COIL amplifier 200 as seen from above.

In the COIL amplifier 200, laser L21 comes into the amplifier chamber 201. The laser L21 at first passes through a convex lens 210, and is focused. The focused laser L21 is reflected at an edge mirror 211, and comes into the COIL amplifier 200 through a window 212a. The window 212a is made of quartz glass plate with an anti-reflection coating on both of its surfaces. The quartz glass plate is placed perpendicularly to the optical axis. Or if the laser L21 is linearly polarized, a Brewster window can be used for the window 212a.

The beam cross section of the laser L22 which is incident on the amplifier chamber 201 gradually increases. The laser L22 exits once from the amplifier chamber 201 through the window 212b. The exit laser L22 is referred to as laser L23. The laser L23 is reflected at bend mirrors 213a and 213b, and thus is propagated in a direction opposite to an initial direction. The laser which is reflected at the bend mirror 213b is referred to as laser L24. The laser L24 enters the amplifier chamber 201 again through the window 212b. The laser which enters the amplifier chamber 201 again is referred to as laser L25. The laser L25 exits from the window 212a. The laser which exits from the window 212a is referred to as laser L26. The laser L26 passes through the large convex lens 214, and is shaped into a parallel beam which is referred to as laser L27.

In this embodiment, the distinctive feature is to use the two bend mirrors 213a and 213b to reflect the laser beam in a direction opposite to the initial direction. This is different from a conventional multi-pass amplifier, in which a single mirror is used to bend the beam by 180 degrees. Whereas, in this embodiment, the two bend mirrors 213a and 213b are used to bend the beam by 180 degrees in order not to superimpose the laser L25 on the laser L22 in the amplifier chamber 201.

The reason for this is explained as follows. In the conventional iodine laser amplifier for a nanoseconds pulse, single-pass amplification cannot extract the amplifier energy efficiently. Therefore, the pulsed laser needs to pass through the amplifier many times. This means that amplified efficiency is not affected if the beam paths are superimposed on each other. Whereas, the pulsed COIL amplifier of this embodiment has the input beam with a long pulse width.

Therefore, the single-pass amplification can extract the amplifier energy efficiently. Thus, the two beams in the amplifier are not superimposed on each other.

According to this embodiment, the dead space of the amplifier chamber 201, which is defined as the amplifier medium where the incident beam does not propagate, can be small. Moreover, compared with the shapes shown in FIG. 8 and FIG. 9, the amplifier length can be halved. It is also possible for the pulsed COIL amplifier 200 to be used like the COIL amplifier 20 shown in FIG. 5.

According to this embodiment, an efficient pulsed iodine laser apparatus can be realized for a long pulse width of longer than 1 microsecond. Specifically, using a COIL which does not require a large pulsed electric power supply, an efficient high-energy iodine amplifier can be realized.

Second Embodiment

Figure 12:
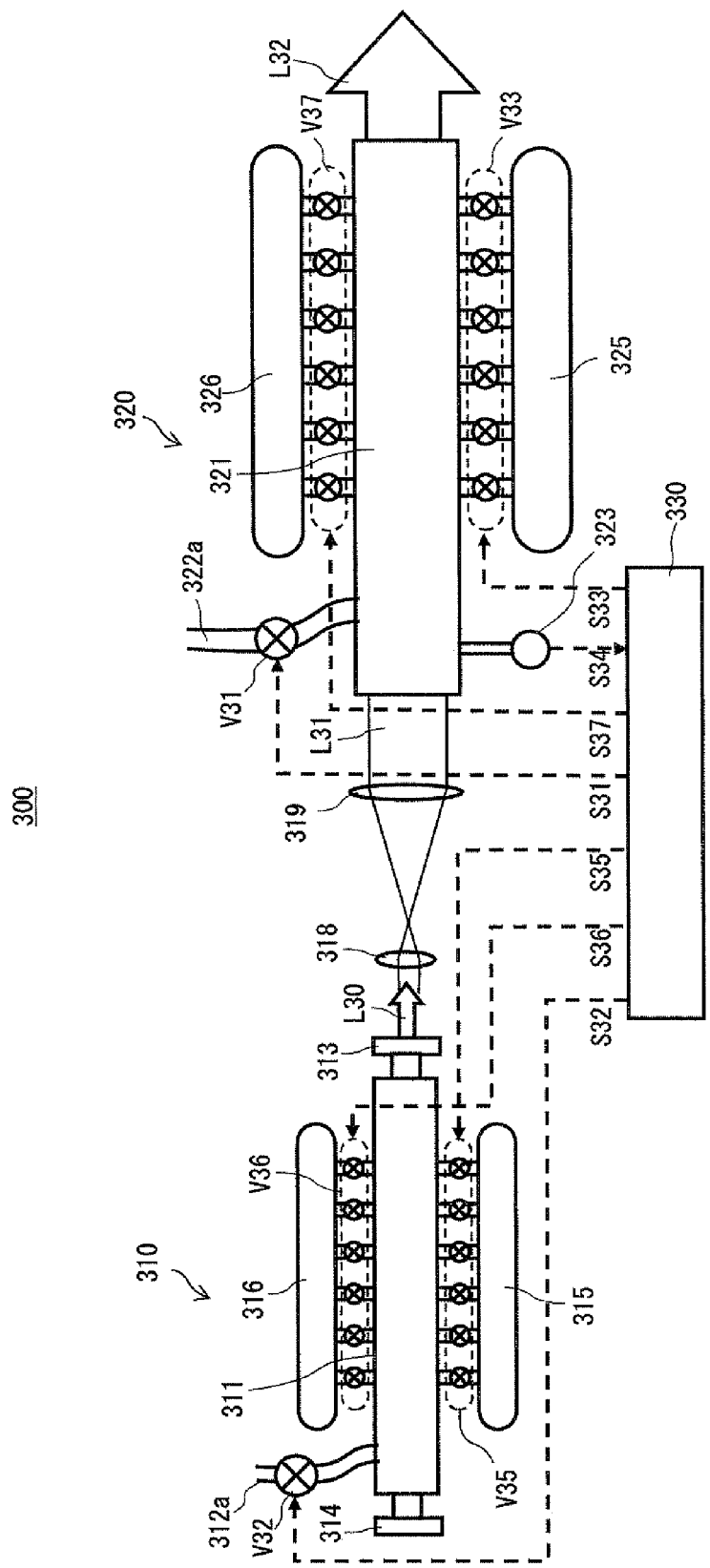
FIG. 12 is a schematic drawing of a pulsed iodine laser 300 according to the embodiment 2.

Hereinafter, the second embodiment of the present invention of the pulsed iodine laser is described based on FIG. 12. FIG. 12 is a schematic drawing of the pulsed iodine laser 300. The pulsed iodine laser 300 is a MOPA system including a COIL. The pulsed iodine laser 300 has an oscillator 310 and a COIL amplifier 320. Using a COIL as the oscillator 310 is one difference between the second embodiment and the first embodiment. Therefore, the configurations of both the COIL oscillator 310 and the COIL amplifier 320 are almost the same as that of the COIL amplifier 20. For example, the cross-sectional configurations of the COIL oscillator 310 and the COIL amplifier 320 are the same as those shown in FIG. 6.

In the COIL oscillator 310, the oscillator chamber 311 is supplied with the singlet oxygen and the iodine molecules. An output mirror 313 is attached to one end of the oscillator 311 and a total reflector 314 is attached to the other end of the oscillator chamber 311. The laser cavity consists of the output mirror 313 and the total reflector 314. The laser L30 is extracted from the output mirror 313. The laser L30 is passed through a beam expander which includes two convex lenses 318 and 319. Then the beam diameter of the laser L30 increases, and it is referred to as laser L31. The laser L31 enters the amplifier chamber 321 of the COIL amplifier 320. Then an amplified laser L32 is extracted from the amplifier chamber 321.

In order to generate singlet oxygen at the SOG of the COIL oscillator 310, chlorine gas is supplied to an oscillator chamber 311 in the same way as in the case of the COIL amplifier 20. Specifically, the chlorine gas is supplied from a high-pressure chlorine tank 315 to a SOG, which is not shown in FIG. 12, located under the oscillator chamber 311. The supply tube located between the high-pressure chlorine tank 315 and the SOG is equipped with a valve 35. The valve 35 controls the flow of the chlorine gas.

The iodine molecule tank 316 is filled with iodine molecules and the buffer gas. As the buffer gas, like the above-mentioned embodiment, helium is used. The iodine molecules and the buffer gas are injected into the oscillator chamber 311 from the iodine molecule tank 316. The valve 36 controls the flow of the iodine molecules and the buffer gas.

The COIL amplifier 320 is equipped with an amplifier chamber 321 which is filled with amplifier medium. Chlorine gas is supplied from a high-pressure chlorine tank 325 to a SOG, which is not shown in FIG. 12, located under the amplifier chamber 321. The supply tube located between the high-pressure chlorine tank 325 and the SOG is equipped with a valve 33. The valve 33 controls the flow of the chlorine gas. Since the COIL oscillator 310 and the COIL amplifier 320 have the same configuration as the configuration shown in the FIG. 6, detailed explanations are omitted.

The iodine molecule tank 326, like the iodine molecule tank 316, is filled with iodine molecules and the buffer gas like in the case of the iodine molecule tank 316. The iodine molecules and the buffer gas are injected into the amplifier chamber 321. The supply tube which supplies the iodine molecules and the buffer gas is equipped with a valve 37. The valve 37 controls the flow of the iodine molecules and the buffer gas.

A vacuum pump which is not shown is connected to the oscillator chamber 311 through a valve 32. Also a vacuum pump (not shown) is connected to the amplifier chamber 321 through a valve 31. In order to operate the pulsed iodine laser 300, the valve 31 and the valve 32 are opened beforehand. Thus, the oscillator chamber 311 and the amplifier chamber 321 are vacuumed. The valve 31 and the valve 32 are controlled by the open/close signal S31 and S32 from the controller 330, respectively. After pumping out the oscillator chamber 311 and the amplifier chamber 321, the controller 330 closes the valve 31 and the valve 32.

Then, the singlet oxygen is supplied into the amplifier chamber 321 of the COIL amplifier 320. In order to do this, the valve 33 is opened by the open/close signal S33 from the controller 330. Immediately after opening the valve 33, the singlet oxygen is supplied into the oscillator chamber 311 of the COIL oscillator 310. In order to do this, the valve 35 is opened by the open/close signal S35 from the controller 330.

A pressure gauge 323 is attached to the amplifier chamber 321. The pressure gauge 323 monitors the pressure of the total oxygen which the amplifier chamber 321 is filled with. The pressure gauge 323 outputs a monitoring signal S34 to the controller 330. The controller 330 controls the valve V36 of the COIL oscillator 310 based on the monitoring signal S34. Specifically, when the pressure of the total oxygen which the amplifier chamber 321 is filled with increases to a predetermined value, the controller outputs the open/close signal S36. Then the valve V36 is opened by the signal S36. Thus, the controller 330 opens the valve V36 when the oxygen pressure reaches the predetermined value. By opening the valve V36, the iodine molecules and the buffer gas are injected into the oscillator chamber 311 of the COIL oscillator 310. Immediately after the injection of the iodine molecules and the buffer gas, laser L30 is extracted from the output mirror 313.

The controller 330 outputs an open/close signal S37 to the valve V37 at almost the same time that it outputs the open/close signal S36. The valve V37 is opened by the signal S37. Then, the iodine molecules and the buffer gas are injected into the amplifier chamber 321 of the COIL amplifier 320. Then, iodine atoms are generated in the amplifier chamber 321. This enables amplification. Immediately after the generation of iodine atoms, the laser L31 comes in the COIL amplifier 320. The COIL amplifier 320 can amplify the laser L31. The laser of L31 amplified by the COIL amplifier 320 becomes laser L32.

As explained above, the feature of this embodiment of the pulsed COIL 300 is that a COIL is used for the oscillator as well as the amplifier. This is realized by outputting the open/close signals S31-S33 and S35-S37 at an optimum timing from the controller 330. Specifically, the controller 330 can precisely control the timing of the injection of the singlet oxygen, and the timing of the injection of the iodine molecules and the buffer gas into the oscillator and the amplifier. In this embodiment, the valves V31-V33 and V35-V37 are controlled according to the pressure of the total oxygen filled in the amplifier chamber 321. For these valves V31-V33 and V35-V37, an electromagnetic valve can be used.

While the invention has been particularly shown and described with reference to exemplary embodiments thereof, the invention includes various modifications which do not negatively affect the purpose and benefits of the invention and is not limited to these exemplary embodiments. For example, if the amplifier consists of two stages, a flashlamp-pumped iodine laser can be used for the first stage, and a COIL amplifier is used for the second stage.

According to the present invention, since a pulsed laser can be propagated for a long distance, it can make a hole in a metal target. Therefore, it can shoot down a missile coming from a long distance away.

While the invention has been particularly shown and described with reference to exemplary embodiments thereof, the invention includes various modifications which do not negatively affect the purpose and benefits of the invention and is not limited to these exemplary embodiments.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

The invention claimed is:

1. A pulsed iodine laser apparatus comprising:
    a flashlamp-pumped iodine laser oscillator which produces a laser pulse with a full pulse width of 1 microsecond or longer; and
    an iodine laser amplifier which employs a singlet oxygen generator and amplifies the laser pulse;
    wherein the iodine laser amplifier has a gas tank which contains chlorine gas, a gas tank which contains iodine molecules, and a controller which controls a timing of injecting the chlorine gas into the singlet oxygen generator, and a timing of injecting the iodine molecules into a chamber of the iodine laser amplifier; and
    wherein the timing of injecting the iodine molecules into the chamber is delayed from the timing of injecting the chlorine gas into the singlet oxygen generator.

2. The pulsed iodine laser apparatus according to claim 1, wherein a cross section of the laser pulse in the iodine laser amplifier is increased upon a propagation distance in the chamber being increased.

3. A pulsed iodine laser apparatus comprising:
    a flashlamp-pumped iodine laser oscillator which produces a laser pulse with a full pulse width of 1 microsecond or longer; and
    an iodine laser amplifier which employs a singlet oxygen generator and amplifies the laser pulse;
    wherein the iodine laser amplifier has a gas tank which contains chlorine gas, a gas tank which contains iodine molecules, and a controller which controls a timing of injecting the chlorine gas into the singlet oxygen generator, and a timing of injecting the iodine molecules into a chamber of the iodine laser amplifier; and
    wherein the timing of injecting the iodine molecules into the chamber is controlled based on an intensity of spontaneous emission from the singlet oxygen generator which the chamber of the iodine laser amplifier is filled with.

4. The pulsed iodine laser apparatus according to claim 3, wherein a cross section of the laser pulse in the iodine laser amplifier is increased upon a propagation distance in the chamber being increased.

* * * * *